Figure 2:
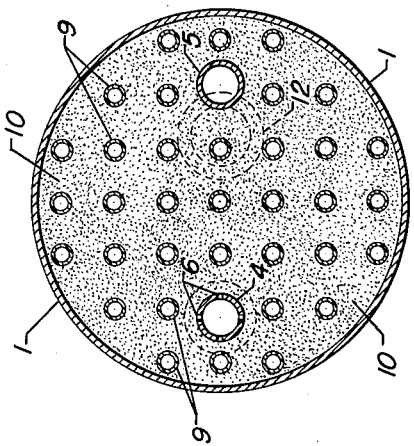

March 7, 1961 L. S. KASSEL 2,974,020
CONTACTOR
Filed Dec. 19, 1958

INVENTOR:
Louis S. Kassel

BY:
Chester J. Giuliani
Philip T. Liggett
ATTORNEYS

United States Patent Office 2,974,020
Patented Mar. 7, 1961

2,974,020
CONTACTOR

Louis S. Kassel, Oak Park, Ill., assignor, by mesne assignments, to Universal Oil Products Company, Des Plaines, Ill., a corporation of Delaware Filed Dec. 19, 1958, Ser. No. 781,575
3 Claims. (Cl. 23—288)

This application is a continuation-in-part of my copending application Serial No. 527,700, filed August 11, 1955, now abandoned. This invention relates to a fluid-solid contactor and in particular to an apparatus specially designed for the efficient contact of a fluid stream with a fixed bed of solid particles.

In many industrial applications it is desirable or necessary to contact a bed of solid particulate material with a fluid stream. Typical of these processes are such operations as leaching a soluble component from solid particles, removing impurities from a liquid by passing that liquid into contact with a bed of ion exchange material, and effecting reactions within a fluid stream or between two components of a fluid stream by passing that stream over a bed of solid, particulate heterogeneous catalytic material. As an example of the latter process, straight run gasolines are improved by reforming them, which reforming is effected by passing vapor phase straight run gasoline mixed with hydrogen into contact with a reforming catalyst such as platinum impregnated pellets of alumina at high temperature and pressure.

Fixed bed contactors of the prior art may be classified into three general categories: down-flow, radial flow, and side-to-side bed. Each has certain advantages and certain drawbacks. In the down-flow type of bed the fluid is passed downwardly through a single, vertically elongated bed; although quite efficient when initially put on stream, the down-flow bed is subject to clogging by foreign matter, increasing pressure drop with time, and ultimate non-utilization of the contact particles due to channeling of the fluid stream. Also, it is frequently difficult to unload the spent particles from the downflow contactor.

In the radial flow, or annular type of contactor, the particles are disposed between vertically elongated, circular concentric screens mounted within a cylindrical vessel. Fluid enters the top of the vessel, flows downwardly along the outer periphery of the bed, and passes horizontally through the annular bed to a central discharge conduit which conducts the fluid out of the vessel through a lower outlet. Although this design largely eliminates clogging of the bed, the non-uniform cross-section of the bed perpendicular to the direction of flow results in a non-linear flow pattern and causes severe channeling. As with the down-flow contactor, it is usually difficult to unload spent particles from the radial flow contactor.

In the side-to-side bed, the particles are maintained within two parallel, vertical screens disposed in a vertically mounted cylindrical vessel. The fluid is passed laterally through the vessel and through the bed of particles. This type of contactor contains relatively large stagnant areas which result in inefficient utilization of the contact mass. Also, the fluid flow is non-linear, and channeling will occur since the direction of flow is perpendicular to the particle density gradient.

It is an object of this invention to provide a specially designed apparatus which provides for a simple fixed bed of contacting material of regular cross-sectional area throughout the bed, free from clogging and with any desired depth and cross-sectional area through which the fluid flows parallel to the particle density gradient and therefore is uneffected by it.

It is another object of this invention to provide a multiple fixed bed contactor which may be easily loaded and unloaded through a single particle inlet and single particle outlet respectively, without removing the connections of the contactor to the process and without disturbing the internal construction of the contactor.

Still another object of this invention is to negative the effect of particle settling and attrition by providing an internal reservoir of particles to replenish contact material lost thereby.

It is an embodiment of this invention to provide a particle contacting apparatus comprising a vertically elongated shell, a normally closed particle inlet at the top and a normally closed particle outlet at the bottom of the shell, and a plurality of vertically spaced, horizontal perforated supporting elements within the shell, multiple conduit means substantially shorter than the distance between said supporting elements depending from each of said supporting elements, fluid introducing means immediately below alternate supporting elements, fluid withdrawal means immediately below the remainder of said supporting elements, a fixed bed of particles on each of said supporting elements extending upwardly to the lower portion of the conduit means depending from the next higher supporting element, and a reservoir of particles on the uppermost of said supporting elements for maintaining a constant inventory of particles on each of the supporting elements therebelow.

The apparatus of this invention may be best described with reference to the accompanying drawing which illustrates one embodiment of this apparatus and is intended to be illustrative rather than limiting upon the broad scope of the invention.

Figure 1:
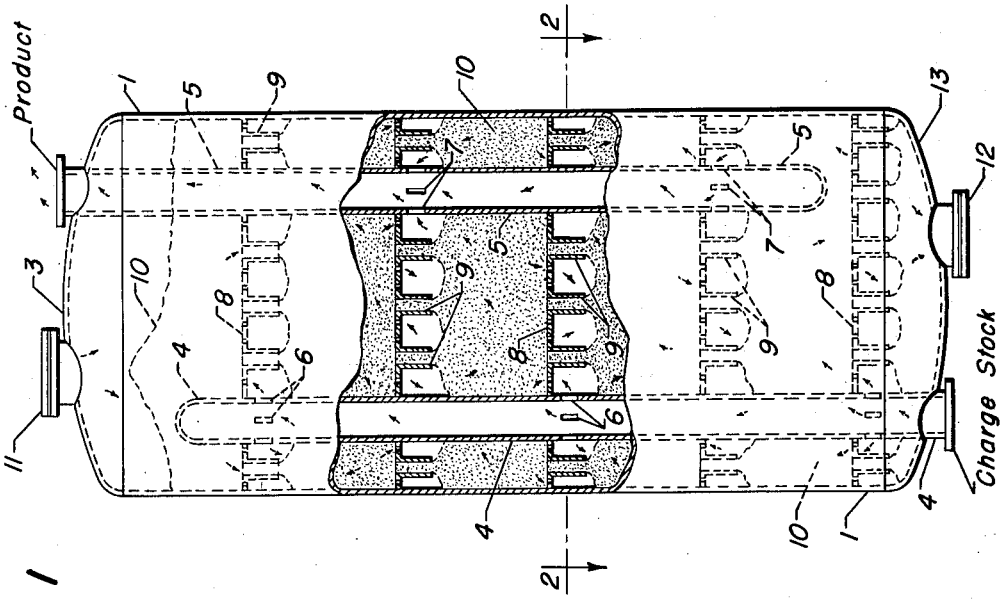

Figure 1 of the drawing shows a sectional elevation view of this particular embodiment illustrating the relationship of the various components, and Figure 2 illustrates a plan view of the apparatus of Figure 1 taken along section 2—2.

Referring to Figure 1, vertically elongated shell 1 is closed at the top by head 3 and at the bottom by head 13. Entering the interior of the shell through the lower head is charge-introducing conduit 4 and entering the interior of shell 1 through upper head 3 is product-withdrawal conduit 5. Both conduit 4 and conduit 5 extend substantially through shell 1 and each is sealed off at one end. These conduits extend through perforated plates 8 maintained at regularly spaced intervals vertically throughout shell 1, and perforations 6 in the inlet conduit 4 open immediately below alternate plates. In the embodiment here shown, the inlet conduit has perforations opening below both the uppermost and lowermost plates of the vessel. Perforations 7 are maintained in product outlet conduit 5 which open immediately below alternate perforated plates; however, these open immediately below the plates not having inlets therebelow. Each of the perforated plates in the shell has a plurality of conduits 9 which are flush or substantially flush with the upper portion of the plate but depend from the lower portion a distance of at least several inches but substantially less than the distance between the plates. Both the upper and lower heads of the shell contain openings for the introduction and discharge respectively of solid particles.

In operation, the apparatus is charged with particles of, for example, platinum-containing alumina pellets in the form of cylinders having a maximum dimension of ⅛", by closing off the opening 12 in the lower head 13 of the apparatus and pouring the above described particles into the opening 11 in the upper head 3. The particles falling upon the uppermost perforated plate 8 trickle down through the short depending conduits 9 on to the next lower plate from which they descend again to the next lower plate until the lowermost plate of the vessel is filled to a level approximately at the bottom of depending conduits 9 from the second lowermost plate. When the plate fills to the bottom of the conduits no further particles can enter and the next higher plate fills until the bottom openings of the next higher set of conduits 9 is submerged in particles after which the process repeats itself over and over until every plate in the apparatus is filled. Because of loss of particles during the operation of the contactor, such loss being caused by breakage, settling and thermal shock, it is necessary to maintain a substantial inventory of catalyst on the uppermost plate to replenish the diminished volume of particles on the lower plates. When the apparatus is filled with particles a bed 10 exists on each plate as well as an empty space immediately below each plate.

Charge stock, such as the above mentioned mixture of straight run gasoline vapors and hydrogen-containing gas passing into charge conduit 4 discharges through perforations 6 into the empty space beneath alternate plates and passes either upwardly through bed 10 as in the case of the lowermost perforations or downwardly through bed 10 as in the case of the uppermost perforations or both upwardly and downwardly through beds 10 as in the case of center plates. After passing through the bed of particles in a vertical direction the vapors discharge at the opposite end of the bed into the empty space below the alternate plates having product-withdrawal perforations and pass through perforations 7 into product-withdrawal conduit 5 and pass from the upper portion of the vessel to whatever further separation or purification processes are desired.

It may readily be seen that the charge and product-withdrawal conduits may be reversed when desired or may be located outside of the vessel and enter beneath each plate through a hole in the vessel wall. Although the particular apparatus shown employs perforated plates, other suitable equivalent means may be used such as woven screening. Many other modifications of this apparatus may be made within the scope of this invention such as varying the number of plates, the size of them, the shape of the vessel, the diameter, length, disposition, or number of conduits 9 depending from each plate, the shape, the size or disposition of inlet and outlet conduits, etc.

Figure 2, as hereinbefore stated, shows a plan view through section 2—2 of the apparatus of Figure 1. In Figure 2 it may be seen that the cross-sectional area of the vessel is occupied by substantially greater area of catalyst than of conduit. Conduits 4 and 5 are shown here to be quite small in diameter as compared with the diameter of the vessel and they may indeed be even smaller than here shown since these figures are for the sake of illustration rather than engineering design. The perforations 6 in inlet conduit 4 are shown here all in one plane and discharging in all directions, which is the preferred mode; however, the perforations may discharge all in the same direction and this will especially be the case when inlet conduit 4 is chordal in cross-section. In this embodiment depending conduits 9 are shown regularly spaced and in a regular pattern; however, more or less of these conduits may be employed and they may be disposed in any suitable manner. The number of depending conduits 9 employed and their relative positions will usually be dictated in accordance with the angle of repose of the particulate material from which bed 10 is made. Therefore, if the particulate material has a steep angle of repose, more conduits 9 will be employed so that the upper surface of the bed will not be too irregular; however, the normal vibrations and disturbances of operation will usually cause a fairly level upper surface of the bed in each zone regardless of the angle of repose of material. And in any event the inventory of particles on the uppermost plate will act to maintain the particle level constant on each of the lower plates.

Although this apparatus has been described with reference to a reforming operation, it may be advantageously utilized in many processes. These include, but are not limited to, cracking, hydrocracking or destructive hydrogenation process wherein hydrocarbons are converted to lower boiling hydrocarbons, alkylation or polymerization reactions wherein lower boiling compounds are converted to higher boiling compounds, isomerization reactions wherein the configuration of molecules in a compound is changed, hydrogenation or dehydrogenation reactions, hydration or dehydration reactions, hydrogen or alkyl transfer reactions and many others.

About the only limitation on the successful operation of this invention is that the particles of solid material constituting the bed must be reasonably flowable both in the fresh and in the spent state.

As may be seen from the foregoing, the apparatus of this invention offers many advantages and improvements over fixed bed contactors of the prior art. Since the direction of flow is parallel to the particle density gradient, uniformity of flow is assured. The provision of a multiplicity of beds disposed in parallel relationship to the flow greatly reduces the pressure drop requirement as compared with a single fixed bed. The loading and unloading of contact material may be accomplished through single, small diameter access ports in the top and bottom heads respectively; no additional access ports or internal equipment are required. The disposition of an inventory of particles on the uppermost plate effectively equalizes the particle level on each of the plates within the contacting zone proper, thus eliminating the problem of particle settling and attrition.

I claim as my invention:

1. A contacting apparatus maintaining a plurality of superimposed beds of particles comprising a vertically elongated shell, a normally closed particle inlet at the top and a normally closed particle outlet at the bottom of the shell, a plurality of vertically spaced, horizontal perforated supporting elements within the shell, multiple conduit means substantially shorter than the distance between said supporting elements depending from each of said supporting elements, fluid introducing means immediately below alternate supporting elements and above the bottom of the conduit means depending from said alternate supporting elements, fluid withdrawal means immediately below the remainder of said supporting elements and above the bottom of the conduit means depending from the last-mentioned supporting elements, a fixed bed of particles maintained on each of said supporting elements extending upwardly to the lower portion of the conduit means depending from the next higher supporting element, and a reservoir of particles on the uppermost of said supporting elements for maintaining a constant inventory of particles on each of the supporting elements therebelow.

2. A contacting apparatus maintaining a plurality of superimposed beds of particles comprising a vertically elongated shell, a normally closed particle inlet at the top and a normally closed particle outlet at the bottom of the shell, a plurality of vertically spaced, horizontal perforated plates within the shell, multiple conduit means substantially shorter than the distance between said perforated plates depending from each of said perforated plates, fluid introducing means immediately below alternate perforated plates and above the bottom of the conduit means depending from said alternate plates, fluid withdrawal means immediately below the remainder of said perforated plates and above the bottom of the conduit means depending from the last-mentioned plates, a fixed bed of particles maintained on each of said perforated plates extending upwardly to the lower portion of the conduit means depending from the next higher perforated plate, and a reservoir of particles on the uppermost of said perforated plates for maintaining a constant inventory of particles on each of the lower perforated plates.

3. A contacting apparatus maintaining a plurality of superimposed beds of particles comprising a vertically elongated shell, a normally closed particle inlet at the top and a normally closed particle outlet at the bottom of the shell, a plurality of vertically spaced, horizontal perforated plates within the shell, open-ended conduits depending from each of said plates and terminating short of the next lower plate in the shell, a vertical fluid inlet conduit extending through one end of the shell and through said plates and terminating in a closed end short of the opposite end of the shell, a vertical fluid outlet conduit extending through said opposite end of the shell and through said plates and terminating in a closed end short of said one end of the shell, perforations in said vertical inlet conduit immediately below alternate perforated plates in the shell and above the bottoms of the open-ended conduits depending from said alternate plates, perforations in said vertical outlet conduit immediately below the remainder of said perforated plates and above the bottoms of the open-ended conduits depending from the last-mentioned plates, a fixed bed of particles maintained on each of said perforated plates extending upwardly to the lower portion of the conduits depending from the next higher perforated plate, and a reservoir of particles on the uppermost of said perforated plates for maintaining a constant inventory of particles on each of the perforated plates therebelow.

References Cited in the file of this patent
UNITED STATES PATENTS

| | | |
|---|---|---|
| 2,320,147 | Layney | May 25, 1943 |
| 2,418,837 | Houdry | Apr. 15, 1947 |
| 2,458,487 | Crowley | Jan. 4, 1949 |
| 2,494,695 | Fisher | Jan. 17, 1950 |
| 2,772,147 | Bowen | Nov. 27, 1956 |